(12) United States Patent
Fan et al.

(10) Patent No.: US 10,083,228 B2
(45) Date of Patent: Sep. 25, 2018

(54) SEARCHING METHOD AND APPARATUS

(71) Applicant: BAIDU ONLINE NETWORK TECHNOLOGY (BEIJING) CO., LTD., Beijing (CN)

(72) Inventors: Guiqun Fan, Beijing (CN); Yuchuan Wang, Beijing (CN); Shitao Huang, Beijing (CN); Yixing An, Beijing (CN); Bin Sun, Beijing (CN); Guoqiang Li, Beijing (CN); Yanyun Liu, Beijing (CN); Xingwei Feng, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 607 days.

(21) Appl. No.: 14/571,974

(22) Filed: Dec. 16, 2014

(65) Prior Publication Data
US 2015/0324464 A1 Nov. 12, 2015

(30) Foreign Application Priority Data
May 6, 2014 (CN) .......................... 2014 1 0189078

(51) Int. Cl.
*G06F 17/30* (2006.01)

(52) U.S. Cl.
CPC .. *G06F 17/30675* (2013.01); *G06F 17/30241* (2013.01); *G06F 17/30598* (2013.01); *G06F 17/30864* (2013.01); *G06F 17/30997* (2013.01)

(58) Field of Classification Search
CPC .... G06F 17/30705; G06F 17/3005–17/30056; G06F 17/30241
See application file for complete search history.

(56) References Cited

U.S. PATENT DOCUMENTS

| | | | |
|---|---|---|---|
| 2008/0147644 A1 | 6/2008 | Aridor et al. | |
| 2008/0172362 A1* | 7/2008 | Shacham | G06F 17/30696 |
| 2009/0030916 A1* | 1/2009 | Andersen | G06F 17/30864 |
| 2009/0157663 A1 | 6/2009 | Kate | |
| 2011/0137919 A1* | 6/2011 | Ryu | G06F 17/30958 |
| | | | 707/748 |
| 2012/0158633 A1* | 6/2012 | Eder | G06F 19/3437 |
| | | | 706/46 |
| 2012/0158687 A1* | 6/2012 | Fang | G06N 5/02 |
| | | | 707/706 |
| 2013/0096945 A1* | 4/2013 | Shah | G06Q 50/24 |
| | | | 705/3 |

(Continued)

FOREIGN PATENT DOCUMENTS

| CN | 102609449 | 7/2012 |
|---|---|---|
| CN | 103425741 | 12/2013 |

(Continued)

*Primary Examiner* — Robert W Beausoliel, Jr.
*Assistant Examiner* — Nirav K Khakhar
(74) *Attorney, Agent, or Firm* — Hodgson Russ LLP

(57) ABSTRACT

A searching method and a searching apparatus are provided. The method includes: obtaining a search term input from a client device; determining a type of the search term, and obtaining a knowledge graph corresponding to the type of the search term; and returning the knowledge graph corresponding to the type of the search term to the client device, such that the client device displays information contained in the knowledge graph in a structured form.

9 Claims, 6 Drawing Sheets

Hualian Commercial Building (Wudaokou) details >>   Full view

Address: Wudaokou, Zhongguancun, Haidian District

Food   Shopping   Leisure   Transport

1. Pizza Hut
2. Chamate
3. New Spicy Way

(56) References Cited

U.S. PATENT DOCUMENTS

2015/0331877 A1* 11/2015 Lou .................. G06F 17/30604
                                                                  707/722

FOREIGN PATENT DOCUMENTS

| CN | 103678281   | 3/2014  |
|----|-------------|---------|
| JP | 2003228580  | 8/2003  |
| JP | 2009169840  | 7/2009  |
| JP | 2011065582  | 3/2011  |
| KR | 100921246   | 10/2009 |
| KR | 20120127523 | 11/2012 |
| WO | 2013020084  | 2/2013  |
| WO | 2014022979  | 2/2014  |

* cited by examiner

SEARCHING METHOD AND APPARATUS

CROSS-REFERENCE TO RELATED APPLICATION

This application claims priority to and benefits of Chinese Patent Application Serial No. 201410189078.2, filed with the State Intellectual Property Office of P. R. China on May 6, 2014, the entire content of which is incorporated herein by reference.

FIELD

Embodiments of the present disclosure generally relate to a computer network technology field, and more particularly to a searching method and a searching apparatus.

BACKGROUND

Currently, when using digital map products, a user can input a name of a location for searching, and obtain POI (Point of Interest) corresponding to the name of the location, usually including addresses, phone numbers, etc.

However, there are following problems existing in the prior art. The obtained POIs are not abundant enough, so they cannot provide the user with information helpful to make decisions. For example, if the user searches for a certain neighborhood, the user can only obtain information about living facilities and transport around the neighborhood in other manners, if the POIs do not include the information. In addition, a plurality of POIs may be obtained during the search of a same location, but the POIs are scattered and independent, so the efficiency of selecting desired information will be reduced, along with poor user experience. For instance, when searching for a commercial building, the user may get independent POIs, because the commercial building has various stores like clothing stores, restaurants, entertainment venues, etc. If information about clothing stores is desired, the user has to traverse the POIs of all the stores manually. Worse still, the user may change the search term for a second search to obtain a more accurate result, if the number of POIs is too large to be displayed in one page. In such a case, the searching cost is increased, while the user experience gets worse.

SUMMARY

The present disclosure seeks to solve at least one of the technical problems existing in the related art to at least some extent.

Accordingly, a first objective of the present disclosure is to provide a searching method, in which the users can obtain desired information more rapidly and conveniently, and thereby make decisions and enjoy a better user experience.

A second objective of the present disclosure is to provide a searching apparatus.

In order to achieve above objectives, embodiments of a first aspect of the present disclosure provide a searching method. The method includes: obtaining a search term input from a client device; determining a type of the search term, and obtaining a knowledge graph corresponding to the type of the search term; and transmitting the knowledge graph corresponding to the type of the search term to the client device, the information contained in the knowledge graph configured to be displayed on the client device in a structured form.

By obtaining the knowledge graph corresponding to the type of the search term via a server, and displaying information contained in the knowledge graph in a structured form via the client device, the searching method according to embodiments of the present disclosure enriches information obtained based on the search term, and provides the users with information helpful to make decisions, such that the users can obtain desired information more rapidly and conveniently, and thereby make decisions with a better user experience.

Embodiments of a second aspect of the present disclosure provide a searching apparatus. The apparatus includes: one or more computing devices configured to execute one or more software modules, the one or more software modules including: an obtaining module configured to obtain a search term input from a client device; a determining module configured to determine a type of the search term, and obtain a knowledge graph corresponding to the type of the search term; and a returning module configured to return the knowledge graph corresponding to the type of the search term to the client device, such that the client device displays information contained in the knowledge graph in a structured form.

By obtaining the knowledge graph corresponding to the type of the search term via a server, and transmitting information contained in the knowledge graph in a structured form via the client device, the searching apparatus according to embodiments of the present disclosure enriches information obtained based on the search term, and provides the users with information helpful to make decisions, such that the users can obtain desired information more rapidly and conveniently, and thereby make decisions with a better user experience.

Embodiments of a third aspect of the present disclosure provide a non-transitory computer readable storage medium. The computer readable storage medium comprises a non-transitory computer program for executing the searching method according to embodiments of the first aspect of the present disclosure, when running on a computer.

Additional aspects and advantages of embodiments of the present disclosure will be given in part in the following descriptions, become apparent in part from the following descriptions, or be learned from the practice of the embodiments of the present disclosure.

DETAILED DESCRIPTION

Figure 1:
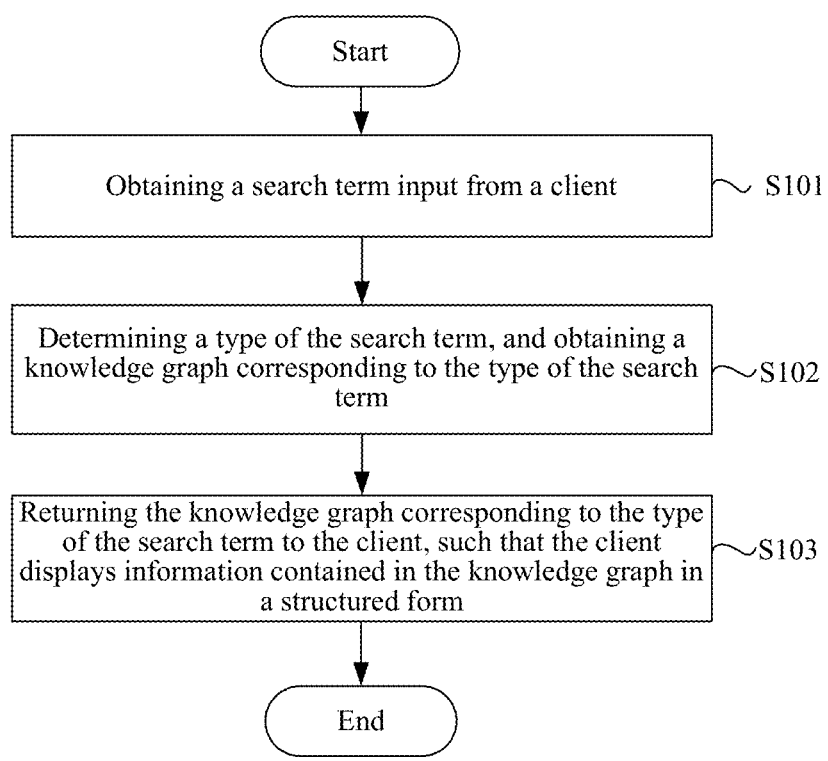
FIG. 1 is a flow chart of a searching method according to an embodiment of the present disclosure.

Embodiments of the present disclosure will be described in detail and examples of the embodiments will be illustrated in the drawings, wherein same or similar reference numerals are used to indicate same or similar members or members with same or similar functions. The embodiments described herein with reference to drawings are explanatory, which are used to illustrate the present disclosure, but shall not be construed to limit the present disclosure.

A searching method and a searching apparatus according to embodiments of the present disclosure will be described in the following with reference to drawings.

FIG. 1 is a flow chart of a searching method that may be performed on one or more computing devices, according to an embodiment of the present disclosure. As shown in FIG. 1, the method includes the following steps.

In step S101: a search term input from a client device is obtained.

In some embodiments, a server can obtain the search term input by the user from the client device. For example, the user may input geographic locations at the client device, such as "Hualian Commercial Building", "Dongyashangbei", etc.

In step S102: a type of the search term is determined, and a knowledge graph corresponding to the type of the search term is obtained.

Specifically, the server can determine the type of the search term, and obtain the knowledge graph corresponding to the type of the search term, in which the types may include commercial buildings, neighborhoods, etc. For example, if the search term is "Hualian Commercial Building", it can be determined that the type of the search term is commercial buildings, and then a knowledge graph corresponding to commercial buildings is obtained.

In step S103: the knowledge graph corresponding to the type of the search term is transmitted to the client device, such that the information contained in the knowledge graph may be displayed by the client device displays in a structured form.

After obtaining the knowledge graph corresponding to the type of the search term, the server can transmit the knowledge graph to the client device, such that the client device displays information contained in the knowledge graph in a structured form.

Figure 2A:
FIG. 2(a) is a rendering 1 of a knowledge graph of commercial buildings displayed in a structured form according to an embodiment of the present disclosure.
Figure 2B:
FIG. 2(b) is a rendering 2 of a knowledge graph of commercial buildings displayed in a structured form according to an embodiment of the present disclosure.
Figure 2C:
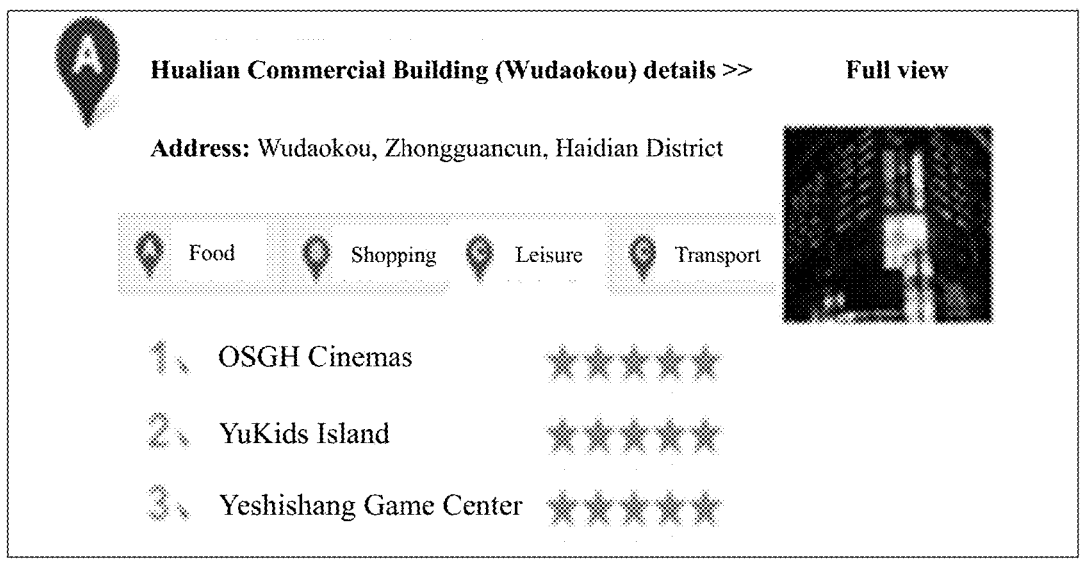
FIG. 2(c) is a rendering 3 of a knowledge graph of commercial buildings displayed in a structured form according to an embodiment of the present disclosure.
Figure 2D:
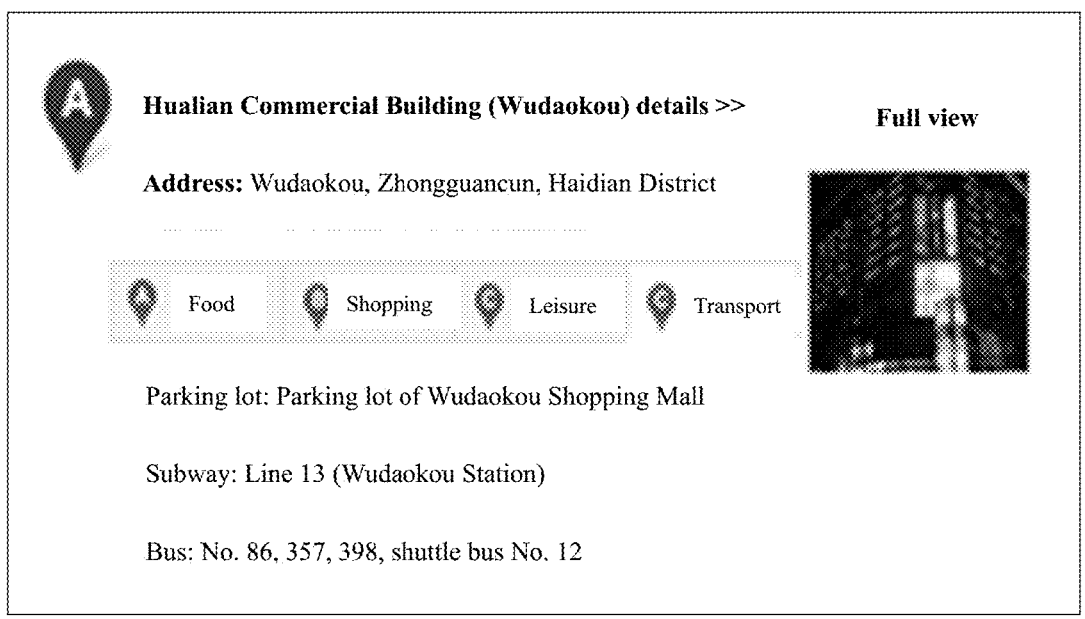
FIG. 2(d) is a rendering 4 of a knowledge graph of commercial buildings displayed in a structured form according to an embodiment of the present disclosure.

For instance, as shown in FIG. 2(a), if the search term is "Hualian Commercial Building (Wudaokou)", it belongs to commercial buildings, and information on commercial buildings may contain labels such as food, shopping, leisure, transport, etc. The child nodes corresponding to the label of food can include: Pizza Hut, Chamate, New Spicy Way, etc. As shown in FIG. 2(b), the child nodes corresponding to the label of shopping can include: Vero Moda, Esprit Men, BreadTalk, Hualian Supermarket, etc. As shown in FIG. 2(c), the child nodes corresponding to the label of leisure can include: OSGH Cinemas, YuKids Island, Yeshishang Game Center, etc. As shown in FIG. 2(d), the child nodes corresponding to the label of transport can include: parking lots around Wudaokou Shopping Mall, line 13 of Beijing Subway (Wudaokou station), Buses No. 86, No. 375, No. 398 and shuttle bus No. 12.

Figure 3A:
FIG. 3(a) is a rendering 1 of a knowledge graph of neighborhoods displayed in a structured form according to an embodiment of the present disclosure.
Figure 3B:
FIG. 3(b) is a rendering 2 of a knowledge graph of neighborhoods displayed in a structured form according to an embodiment of the present disclosure.
Figure 3C:
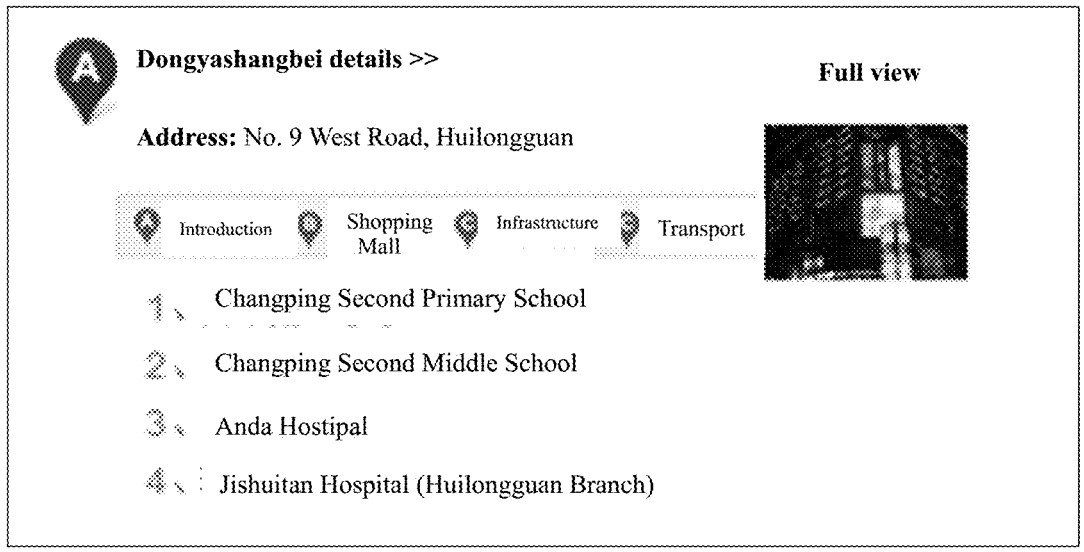
FIG. 3(c) is a rendering 3 of a knowledge graph of neighborhoods displayed in a structured form according to an embodiment of the present disclosure.
Figure 3D:
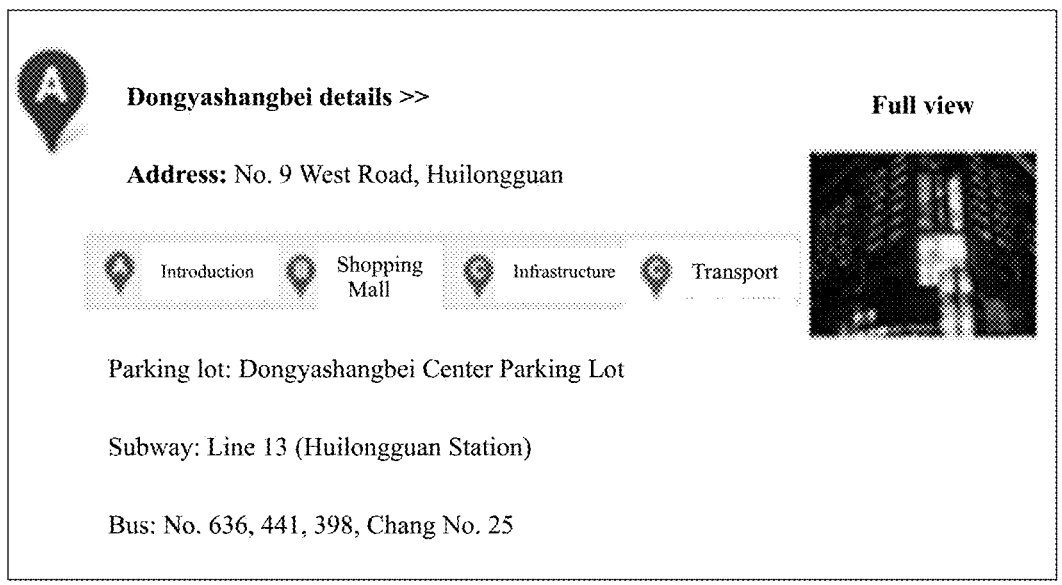
FIG. 3(d) is a rendering 4 of a knowledge graph of neighborhoods displayed in a structured form according to an embodiment of the present disclosure.

As another example, as shown in FIG. 3(a), if the search term is "Dongyashangbei", it belongs to neighborhoods, and information on neighborhoods may contain labels such as introduction, shopping mall, infrastructure, transport, etc. The child nodes corresponding to the label of introduction can be that: "Dongyashangbei" belongs to high-rise school district housings, with a housing area of 80 to 120 square meters per household and a housing price of 30,000 yuan ($4,876) per square meter. As shown in FIG. 3(b), the child nodes corresponding to the label of shopping mall can include: Times Square, Hualian Commercial Building, Shopin, Yishang Department Store, all of which are shopping malls around "Dongyashangbei". As shown in FIG. 3(c), the child nodes corresponding to the label of infrastructure can include: Changping Second Primary School, Changping Second Middle School, Anda Hostipal, Jishuitan Hospital (Huilongguan Branch), all of which are infrastructures around "Dongyashangbei". As shown in FIG. 3(d), the child nodes corresponding to the label of transport can include: parking lots of Dongyashangbei Center, line 13 of Beijing Subway (Huilongguan station), Buses No. 636, No. 441, No. 398 and Chang No. 25.

By obtaining the knowledge graph corresponding to the type of the search term via a server, and displaying information contained in the knowledge graph in a structured form via the client device, the searching method according to embodiments of the present disclosure enriches information obtained based on the search term, and provides the users with information helpful to make decisions, such that the users can obtain desired information more rapidly and conveniently, and thereby make decisions with a better user experience.

In some embodiments, the server may first construct and save knowledge graphs corresponding to different types of search terms, such that the user can obtain the knowledge graph corresponding to the type of the search term.

Figure 4:
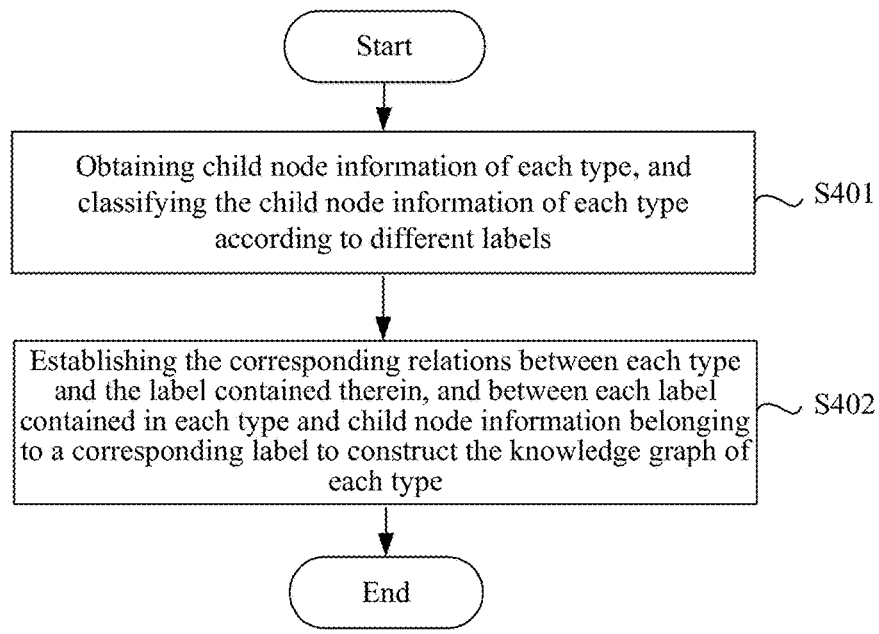
FIG. 4 is a flow chart of constructing and saving knowledge graphs corresponding to different types of search terms according to an embodiment of the present disclosure.

Specifically, as shown in FIG. 4, constructing and saving knowledge graphs corresponding to different types of search terms includes the following steps.

In step S401: child node information of each type is obtained, and the child node information is classified according to different labels.

In this embodiment, the server can obtain the child node information of each type according to different fields with respect to different types, for example, obtain the child node information of commercial buildings according to address fields. If the address field of "Häagen-Dazs" is F1-24, ground floor, Hualian Commercial Building (Shangdi), No. 1 Building, No. 1 Nongda South Road, Haidian District (close to the south exit of Shangdi station), "Häagen-Dazs" can be one of the child nodes of Hualian Commercial Building (Shangdi), and relevant information on "Häagen-Dazs" can be obtained. If the type belongs to neighborhoods, the child node information on neighborhood surroundings can be obtained according to location coordinates. For instance, Changping Second Middle School is close to Dongyashangbei neighborhood, so the school can be one of the child nodes of Dongyashangbei, and relevant information on the school can be obtained.

In addition, the server can set corresponding labels for different types respectively. In this embodiment, it can be predetermined that information on commercial buildings can include labels such as food, shopping, leisure and transport; information on neighborhoods can include labels such as introduction, shopping mall, infrastructure and transport. Specifically, the child node information of commercial buildings can be classified according to the labels, after they are obtained, e.g. Pizza Hut, Chamate, New Spicy Way, Vero Moda, Esprit Men, BreadTalk, Hualian Supermarket, OSGH Cinemas, YuKids Island, Yeshishang Game Center, parking lots around Wudaokou Shopping Mall, line 13 of Beijing Subway (Wudaokou station), Buses No. 86, No. 375, No. 398 and shuttle bus No. 12. The label of food herein includes Pizza Hut, Chamate, and New Spicy Way; the label of shopping includes Vero Moda, Esprit Men, BreadTalk, and Hualian Supermarket; the label of leisure includes OSGH Cinemas, YuKids Island, and Yeshishang Game Center; and the label of transport includes parking lots around Wudaokou Shopping Mall, line 13 of Beijing Subway (Wudaokou station), Buses No. 86, No. 375, No. 398 and shuttle bus No. 12.

Similarly, the child node information of neighborhoods can be classified according to the labels, after they are obtained, e.g. high-rise school district housings, 80 to 120 square meters, 30,000 yuan ($4,876) per square meter, Times Square, Hualian Commercial Building, Shopin, Yishang Department Store, Changping Second Primary School, Changping Second Middle School, Anda Hostipal, Jishuitan Hospital (Huilongguan Branch), parking lots of Dongyashangbei Center, line 13 of Beijing Subway (Huilongguan station), Buses No. 636, No. 441, No. 398 and Chang No. 25. The label of introduction herein includes high-rise school district housings, 80 to 120 square meters, and 30,000 yuan ($4,876) per square meter; the label of shopping mall includes Times Square, Hualian Commercial Building, Shopin, and Yishang Department Store; the label of infrastructure includes Changping Second Primary School, Changping Second Middle School, Anda Hostipal, and Jishuitan Hospital (Huilongguan Branch); the label of transport includes parking lots of Dongyashangbei Center, line 13 of Beijing Subway (Huilongguan station), Buses No. 636, No. 441, No. 398 and Chang No. 25.

In step S402: the corresponding relations between each type and the label contained therein, and between each label contained in each type and child node information belonging to a corresponding label are established to construct the knowledge graph of each type.

After classifying the child node information of each type according to different labels, the server can establish corresponding relations between each type and the label contained therein, and between each label contained in each type and child node information belonging to a corresponding label, to construct the knowledge graph of each type. Specifically, the server can establish a corresponding relation between commercial buildings and the labels (e.g., food, shopping, leisure and transport) contained in the commercial buildings, and a corresponding relation between neighborhoods and the labels (e.g., introduction, shopping mall, infrastructure, and transport) contained in the neighborhoods. More specifically, supposing there are Pizza Hut, Chamate, New Spicy Way, OSGH Cinemas, YuKids Island, Vero Moda, Esprit Men, Hualian Supermarket, subway line 13, Bus No. 86, all of which is child node information, around "Hualian Commercial Building (Wudaokou)", the server can establish the corresponding relations between the label of food and Pizza Hut, Chamate, New Spicy Way respectively, between the label of leisure and OSGH Cinemas, YuKids Island respectively, between the label of shopping and Vero Moda, Esprit Men respectively, and between the label of transport and subway line 13, Bus No. 86 respectively.

Similarly, supposing there are high-rise school district housings, 80 to 120 square meters, 30,000 yuan ($4,876) per square meter, Times Square, Hualian Commercial Building, Shopin, Yishang Department Store, Changping Second Primary School, Changping Second Middle School, Anda Hostipal, Jishuitan Hospital (Huilongguan Branch), parking lots of Dongyashangbei Center, line 13 of Beijing Subway (Huilongguan station), Buses No. 636, No. 441, No. 398 and Chang No. 25, all of which is child node information, around "Dongyashangbei", the server can establish the corresponding relations between the label of introduction and high-rise school district housings, 80 to 120 square meters, 30,000 yuan ($4,876) per square meter respectively, between the label of shopping mall and Times Square, Hualian Commercial Building, Shopin, Yishang Department Store respectively, between the label of infrastructure and Changping Second Primary School, Changping Second Middle School, Anda Hostipal, Jishuitan Hospital (Huilongguan Branch) respectively, and between the label of transport and parking lots of Dongyashangbei Center, line 13 of Beijing Subway (Huilongguan station), Buses No. 636, No. 441, No. 398 and Chang No. 25.

The searching method according to embodiments of the present disclosure first constructs a corresponding knowledge graph for each type, to obtain the knowledge graphs corresponding to the types of the search terms, such that the client device may display information contained in the knowledge graphs in a structured form.

To realize the above embodiment, the present disclosure further provides a searching apparatus.

Figure 5:
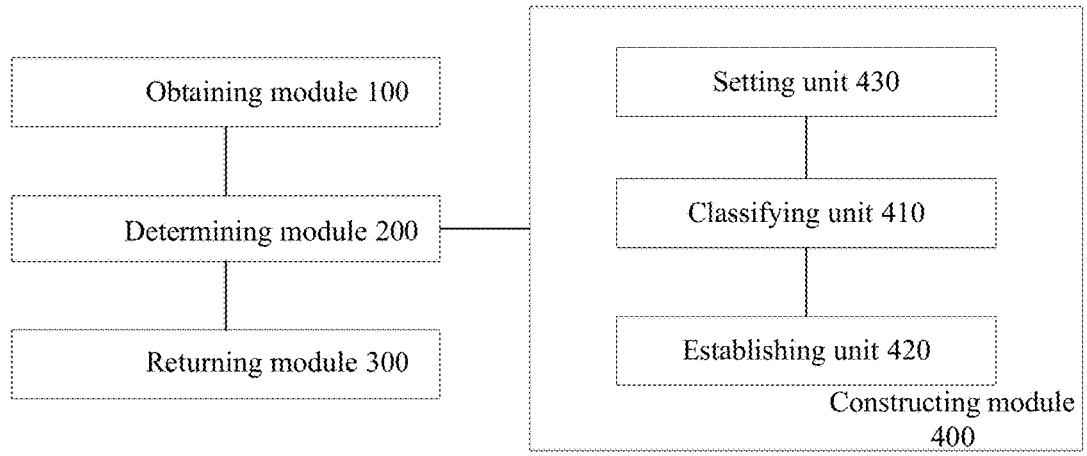
FIG. 5 is a block diagram of a searching apparatus according to an embodiment of the present disclosure.

FIG. 5 is a block diagram of a searching apparatus according to an embodiment of the present disclosure. As shown in FIG. 5, the searching apparatus includes an obtaining module 100, a determining module 200, a returning module 300 and a constructing module 400, in which the constructing module 400 includes a classifying unit 410, an establishing unit 420 and a setting unit 430.

The obtaining module 100 is configured to obtain a search term input from a client device.

In some embodiments, the obtaining module 100 may obtain the search term input by the user from the client device. For example, the user may input geographic locations at the client device, such as "Hualian Commercial Building", "Dongyashangbei", etc.

The determining module 200 is configured to determine a type of the search term, and obtain a knowledge graph corresponding to the type of the search term.

The determining module 200 can determine the type of the search term, and obtain the knowledge graph corresponding to the type of the search term, in which the types may include commercial buildings, neighborhoods, etc. For example, if the search term is "Hualian Commercial Building", the determining module 200 may determine that the type of the search term is commercial buildings, and then obtain a knowledge graph corresponding to commercial buildings.

The returning module 300 is configured to transmit the knowledge graph corresponding to the type of the search term to the client device, such that information contained in the knowledge graph may be displayed on the client device in a structured form.

After obtaining the knowledge graph corresponding to the type of the search term, the returning module 300 can transmit the knowledge graph to the client device, such that information contained in the knowledge graph may be displayed on the client device in a structured form.

For instance, as shown in FIG. 2(a), if the search term is "Hualian Commercial Building (Wudaokou)", it belongs to commercial buildings, and information on commercial buildings may contain labels such as food, shopping, leisure, transport, etc. The child nodes corresponding to the label of food can include: Pizza Hut, Chamate, New Spicy Way, etc. As shown in FIG. 2(b), the child nodes corresponding to the label of shopping can include: Vero Moda, Esprit Men, BreadTalk, Hualian Supermarket, etc. As shown in FIG. 2(c), the child nodes corresponding to the label of leisure can include: OSGH Cinemas, YuKids Island, Yeshishang Game Center, etc. As shown in FIG. 2(d), the child nodes corresponding to the label of transport can include: parking lots around Wudaokou Shopping Mall, line 13 of Beijing Subway (Wudaokou station), Buses No. 86, No. 375, No. 398 and shuttle bus No. 12.

As another example, as shown in FIG. 3(a), if the search term is "Dongyashangbei", it belongs to neighborhoods, and information on neighborhoods may contain labels such as introduction, shopping mall, infrastructure, transport, etc. The child nodes corresponding to the label of introduction can be that: "Dongyashangbei" belongs to high-rise school district housings, having a housing area of 80 to 120 square meters per household and a housing price of 30,000 yuan ($4,876) per square meter. As shown in FIG. 3(b), the child nodes corresponding to the label of shopping mall can include: Times Square, Hualian Commercial Building, Shopin, Yishang Department Store, all of which are shopping malls around "Dongyashangbei". As shown in FIG. 3(c), the child nodes corresponding to the label of infrastructure can include: Changping Second Primary School, Changping Second Middle School, Anda Hostipal, Jishuitan Hospital (Huilongguan Branch), all of which are infrastructures around "Dongyashangbei". As shown in FIG. 3(d), the child nodes corresponding to the label of transport can include: parking lots of Dongyashangbei Center, line 13 of Beijing Subway (Huilongguan station), Buses No. 636, No. 441, No. 398 and Chang No. 25.

The constructing module 400 is configured to construct and save knowledge graphs corresponding to different types of search terms. Specifically, the constructing module 400 includes the classifying unit 410, the establishing unit 420 and the setting unit 430.

The classifying unit 410 is configured to obtain child node information of each type, and classify the child node information according to different labels.

Specifically, the classifying unit 410 can obtain the child node information of each type according to different fields with respect to different types, for example, obtain the child node information of commercial buildings according to address fields. If the address field of "Häagen-Dazs" is F1-24, ground floor, Hualian Commercial Building (Shangdi), No. 1 Building, No. 1 Nongda South Road, Haidian District (close to the south exit of Shangdi station), "Häagen-Dazs" can be one of the child nodes of Hualian Commercial Building (Shangdi), and relevant information on "Häagen-Dazs" can be obtained. If the type belongs to neighborhoods, the child node information on neighborhood surroundings can be obtained according to location coordinates. For instance, Changping Second Middle School is close to Dongyashangbei neighborhood, so the school can be one of the child nodes of Dongyashangbei, and relevant information on the school can be obtained.

In some embodiments, the classifying unit 410 classifies the child node information of each type according to different labels, after each type is labeled.

For example, Pizza Hut, Chamate, and New Spicy Way are labeled as food, so they can be regarded as the same type. Similarly, Vero Moda, Esprit Men, BreadTalk, and Hualian Supermarket are labeled as shopping, and then they belong to the same type.

The establishing unit 420 is configured to establish corresponding relations between each type and the labels contained therein, and between each label contained in each type and child node information belonging to a corresponding label, to construct the knowledge graph of each type.

After the child node information of each type is classified according to different labels, the establishing unit 420 can establish corresponding relations between each type and the label contained therein, and between each label contained in each type and child node information belonging to a corresponding label, to construct the knowledge graph of each type. Specifically, the establishing unit 420 can establish a corresponding relation between commercial buildings and the labels (e.g., food, shopping, leisure and transport) contained in the commercial buildings, and a corresponding relation between neighborhoods and the labels (e.g., introduction, shopping mall, infrastructure, and transport) contained in the neighborhoods. More specifically, there are Pizza Hut, Chamate, New Spicy Way, OSGH Cinemas, YuKids Island, Vero Moda, Esprit Men, Hualian Supermarket, subway line 13, Bus No. 86, all of which is child node information, around "Hualian Commercial Building (Wudaokou)". The establishing unit 420 can establish the corresponding relations between the label of food and Pizza Hut, Chamate, New Spicy Way respectively, between the label of leisure and OSGH Cinemas, YuKids Island respectively, between the label of shopping and Vero Moda, Esprit Men respectively, and between the label of transport and subway line 13, Bus No. 86 respectively.

Similarly, there are high-rise school district housings, 80 to 120 square meters, 30,000 yuan ($4,876) per square meter, Times Square, Hualian Commercial Building, Shopin, Yishang Department Store, Changping Second Primary School, Changping Second Middle School, Anda Hostipal, Jishuitan Hospital (Huilongguan Branch), parking lots of Dongyashangbei Center, line 13 of Beijing Subway (Huilongguan station), Buses No. 636, No. 441, No. 398 and Chang No. 25, all of which is child node information, around "Dongyashangbei". The establishing unit 420 can establish the corresponding relations between the label of introduction and high-rise school district housings, 80 to 120 square meters, 30,000 yuan ($4,876) per square meter respectively, between the label of shopping mall and Times Square, Hualian Commercial Building, Shopin, Yishang Department Store respectively, between the label of infrastructure and Changping Second Primary School, Changping Second Middle School, Anda Hostipal, Jishuitan Hospital (Huilongguan Branch) respectively, and between the label of transport and parking lots of Dongyashangbei Center, line 13 of Beijing Subway (Huilongguan station), Buses No. 636, No. 441, No. 398 and Chang No. 25.

The setting unit 430 is configured to set corresponding labels for different types respectively, before the classification according to different labels.

Information contained in the knowledge graph comprises labels under the types of the search terms and child node information belonging to corresponding labels. The setting unit 430 can set corresponding labels for different types respectively. In this embodiment, it can be predetermined that information on commercial buildings can include labels such as food, shopping, leisure and transport; and information on neighborhoods can include labels such as introduction, shopping mall, infrastructure and transport.

By obtaining the knowledge graph corresponding to the type of the search term via the server, and transmitting information contained in the knowledge graph in a structured form to the client device, the searching apparatus according to embodiments of the present disclosure enriches information obtained based on the search term, and provides the users with information helpful to make decisions, such that the users can obtain desired information more rapidly and conveniently, and thereby make decisions with a better user experience.

A computer readable storage medium according to embodiments of the present disclosure is also provided. The computer readable storage medium comprises a computer program for executing the searching method according to the above embodiments of the present disclosure, when running on a computer.

Reference throughout this specification to "an embodiment," "some embodiments," "examples," "specific examples," or "some examples," means that a particular feature, structure, material, or characteristic described in connection with the embodiment or example is included in at least one embodiment or example of the present invention. Thus, these terms throughout this specification do not necessarily refer to the same embodiment or example of the present disclosure. Furthermore, the particular features, structures, materials, or characteristics may be combined in any suitable manner in one or more embodiments or examples. Moreover, those skilled in the art can combine different embodiments and examples, and the features thereof described in the specification without contradiction against each other.

In addition, it shall be noted that terms such as "first" and "second" are used herein for purposes of description and are not intended to indicate or imply relative importance or to imply the number of indicated technical features. Thus, the feature defined with "first" and "second" may explicitly or implicitly include one or more of this feature. Furthermore, in the description of the present invention, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, not necessarily in the sequence shown or discussed here, but probably including the almost same or reverse sequence of the involved functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been shown and described, it would be appreciated by those skilled in the art that the above embodiments cannot be construed to limit the present invention, and changes, modifications, alternatives and variations can be made in the embodiments within the scope of the present invention.

What is claimed is:

1. A computer-implemented searching method, applied in digital map products and comprising:

obtaining, at one or more computing devices, a search term input corresponding to a geographical location from a digital map product operating on a client device, the digital map product being configured to be displayed on a screen of the client device;

determining, at the one or more computing devices, a type of the search term input, the type of the search term input including one or more of the following: a building and a neighborhood; determining, at the one or more computing devices, that search results from the search term include multiple points of interest at the geographical location;

obtaining, at the one or more computing devices, a knowledge graph corresponding to the type of the search term input, wherein the knowledge graph comprises a plurality of tabs, each of the plurality of tabs corresponding to a category of the search results, wherein each of the plurality of tabs are updated based on a determined relationship between the search results and the category, and a plurality of nodes corresponding to each tab, the plurality of nodes corresponding to the search results; and transmitting, using the one or more computing devices, the knowledge graph corresponding to the type of the search term to the client device, such that the knowledge graph is configured to be displayed within the digital map product on the screen of the client device;

before determining, at the one or more computing devices, that the search results from the search term include multiple points of interest at the geographical location:

obtaining, at the one or more computing devices, child node information of each type;

classifying, at the one or more computing devices, the child node information according to different labels; and establishing, at the one or more computing devices, corresponding relations between each type and the label contained therein, and between each label contained in each type and child node information belonging to a corresponding label to construct the knowledge graph of each type;

saving the knowledge graphs, at the one or more computing devices, corresponding to different types of search term inputs;

wherein the knowledge graph is transmitted such that it is configured to be displayed and dynamically updated in a structured form within the digital map product.

2. The method according to claim 1, wherein obtaining child node information of each type comprises:

obtaining, at the one or more computing devices, the child node information of each type according to different fields with respect to different types.

3. The method according to claim 1, further comprising: setting, using the one or more computing devices, corresponding labels for different types respectively.

4. The method according to claim 1, wherein information contained in the knowledge graph comprises labels under the types of the search terms and child node information belonging to corresponding labels.

5. A computer-implemented searching apparatus, applied in digital map products and comprising:

one or more computing devices configured to execute one or more software modules, the one or more software modules including:

an obtaining module configured to obtain a search term input corresponding to a geographical location from a digital map product operating on a client device, the digital map product being configured to be displayed on a screen of the client device;

a determining module configured to determine a type of the search term and configured to determine that search results from the search term include multiple points of interest at the geographical location, the type of the search term input including one or more of the following: a building and a neighborhood, and obtain a knowledge graph corresponding to the type of the search term, wherein the knowledge graph comprises a plurality of tabs, each of the plurality of tabs corresponding to a category of the search results, wherein each of the plurality of tabs are updated based on a determined relationship between the search results and the category, and a plurality of nodes corresponding to each tab, the plurality of nodes corresponding to the search results; and a returning module configured to return the knowledge graph corresponding to the type of the search term to the client device, such that the knowledge graph is configured to be displayed within the digital map product on the screen of the client device;

wherein the one or more software modules further comprises:

a constructing module configured to construct and save knowledge graphs corresponding to different types of search terms;

wherein the constructing module comprises:

a classifying unit configured to obtain child node information of each type, and classify the child node information according to different labels; and an establishing unit configured to establish corresponding relations between each type and the labels contained therein, and between each label contained in each type and child node information belonging to a corresponding label, to construct the knowledge graph of each type;

wherein the knowledge graph is transmitted such that it is configured to be displayed and dynamically updated in a structured form within the digital map product.

6. The apparatus according to claim 5, wherein the classifying unit is configured to obtain the child node information of each type according to different fields with respect to different types.

7. The apparatus according to claim 5, wherein the constructing module further comprises:

a setting unit configured to set corresponding labels for different types respectively.

8. The apparatus according to claim 5, wherein information contained in the knowledge graph comprises labels under the types of the search terms and child node information belonging to corresponding labels.

9. A non-transitory computer readable storage medium, comprising a computer program applied in digital map products and configured to execute the following steps on one or more computing devices:

obtaining, at one or more computing devices, a search term input corresponding to a geographical location from a digital map product operating on a client device, the digital map product being configured to be displayed on a screen of the client device;

determining, at the one or more computing devices, a type of the search term input, the type of the search term input including one or more of the following: a building and a neighborhood;

determining, at the one or more computing devices, that search results from the search term include multiple points of interest at the geographical location;

obtaining, at the one or more computing devices, a knowledge graph corresponding to the type of the search term input, wherein the knowledge graph comprises a plurality of tabs, each of the plurality of tabs corresponding to a category of the search results, wherein each of the plurality of tabs are updated based on a determined relationship between the search results and the category, and a plurality of nodes corresponding to each tab, the plurality of nodes corresponding to the search results; and transmitting, using the one or more computing devices, the knowledge graph corresponding to the type of the search term to the client device, such that the knowledge graph is configured to be displayed within the digital map product on the screen of the client device;

before determining, at the one or more computing devices, that the search results from the search term include multiple points of interest at the geographical location:

obtaining, at the one or more computing devices, child node information of each type;

classifying, at the one or more computing devices, the child node information according to different labels; and establishing, at the one or more computing devices, corresponding relations between each type and the label contained therein, and between each label contained in each type and child node information belonging to a corresponding label to construct the knowledge graph of each type;

saving the knowledge graphs, at the one or more computing devices, corresponding to different types of search term inputs;

wherein the knowledge graph is transmitted such that it is configured to be displayed and dynamically updated in a structured form within the digital map product.

\* \* \* \* \*